W. A. JORDAN.
Treating Cane Juice.
No. 63,527. Patented April 2, 1867.
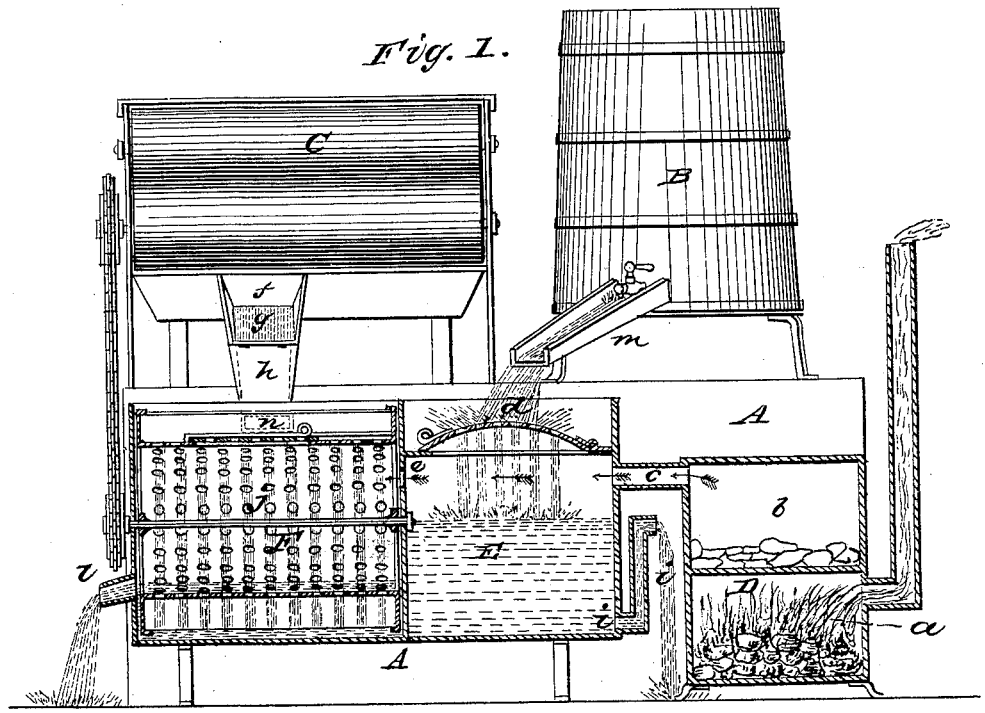
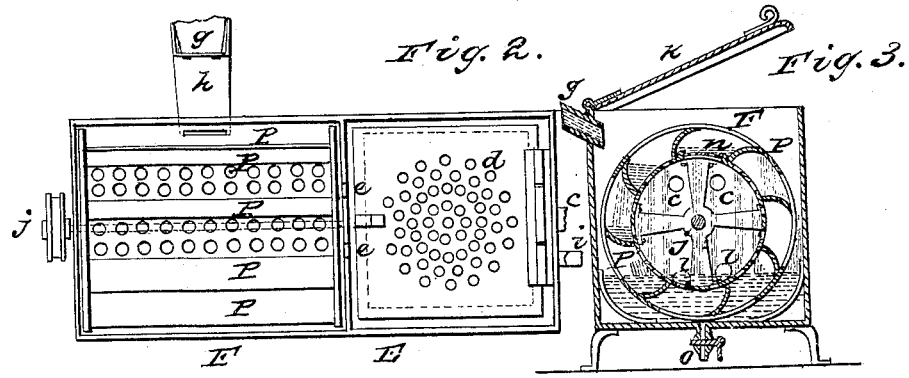
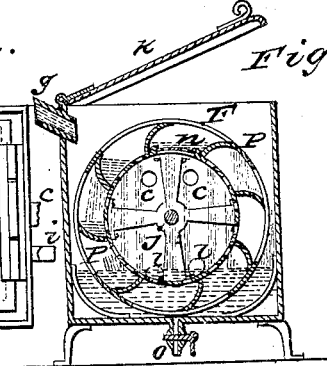

United States Patent Office.

WILLIAM A. JORDAN, OF NEW ORLEANS, LOUISIANA.

Letters Patent No. 63,527, dated April 2, 1867.

IMPROVED APPARATUS FOR BLEACHING CANE JUICE.

The Schedule referred to in these Letters Patent and making part of the same.

TO ALL WHOM IT MAY CONCERN:

Be it known that I, WILLIAM A. JORDAN, of New Orleans, in the parish of Orleans, and State of Louisiana, have invented a new and improved Apparatus for Bleaching and Clarifying Cane Juices; and I do hereby declare that the following is a full, clear, and exact description thereof, which will enable others skilled in the art to make and use the same, reference being had to the accompanying drawings, making a part of this specification, in which—

Figure 1 is a side sectional elevation of my invention.
Figure 2 is a plan view of same.
Figure 3 is a transverse section of the juice box F.

This invention pertains to that class of apparatuses used in the clarifying of cane juices by means of sulphus gas, with an improvement to my invention for which I obtained Letters Patent (No. 43,509) July 12, 1864, the specification of which is in substance as follows:

A is an elevated platform constructed in a suitable manner for the support upon it of a water-tank or cistern, B, (which may be as shown, or at any other convenient place,) and the roller machinery C, for expressing the cane juice. D is a stove having a fire-chamber, a, and above it a sulphur oven, b; pipe c conducts the fumes of sulphur gas from oven b into the purifying-box E, as is indicated by the arrows. Near the top of box E, attached by hinges to the projecting flanges, is hung a perforated spherical-shaped or inclining cover, d. On the side of this box are openings e, through which the purified gas passes to the juice receptacle F, which latter is supplied by the flow of juice from the trough f, under the roller machine C, through the duct g. i is a waste pipe attached to the box E, bent up from the bottom of the box, as shown, forming an overflow trap to permit the exit of water when it has risen to a line within the box equal in height to the discharge orifice of the pipe i. A constant uniform water line or level is thus maintained in the box E. The juice receptacle F, on which my improvement mainly is based, instead of having a perforated cover similar to box E, as in my former invention, has now a perforated revolving cylinder, to the outer surface of which are attached paddles or buckets, P, the whole revolving on axle j, which may receive power in connection with the cane rollers C, as shown, or from any other source most convenient. The box F has an air-tight cover, k, which, with the flood-gate h, prevents the gas from escaping through any place but at the discharge duct l.

The operation is as follows: The plate in oven or stove D, on which the sulphur is deposited in b, being heated below by any process at a, melts the sulphur on pan in oven b, the fumes of which pass through c into the purifying box E, into which there is now descending a flow of water from cistern B, through trough m; the water falls on and through the perforated cover d, (which may be as shown, or of an inclined form,) causes the water to spread over its surface in an even sheet, and to pass through it in the manner of a fine and constantly descending rain, through which rain the gas passes, being thereby purified, and from the box E enters the juice-box F through openings e. The juice is conducted through the trough g into the receptacle F, where it receives a continuous and violent agitation, thereby thoroughly diffusing the sulphur gas throughout the juice, and effecting the bleaching and clarification by chemical action. The clarified juice escapes through l into suitable vessels there placed for its reception, while the gas also finds its way to the atmosphere through the same opening. On the outer surface of the perforated cylinder in box F, at n, is a movable section sliding in grooves; also at the bottom of the box at o is attached a faucet, all of which are for washing out and cleansing the same when required.

Having thus described the improvement on my former invention, I desire to secure by Letters Patent, and claim, the purifying of sulphur gas through water in the manner specified and shown, for the purpose of bleaching and clarifying cane juices in a thorough manner by means of the improved perforated revolving cylinder, with paddles or buckets combined, enclosed in box F, in the manner herein described and shown by the accompanying drawings.

WILLIAM A. JORDAN.

Witnesses:
SAM'L B. HAGGART,
JOHN CONSIDINE.